May 20, 1969   E. H. DOUGLAS   3,445,104
INTERNAL PIPE CLAMP
Filed Nov. 29, 1966   Sheet 2 of 2
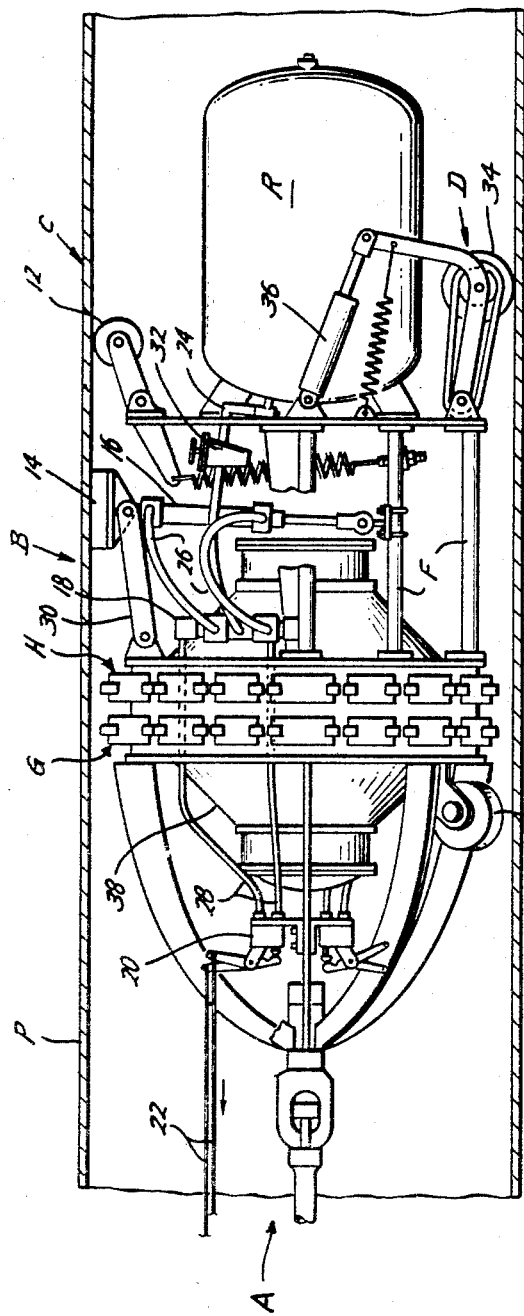
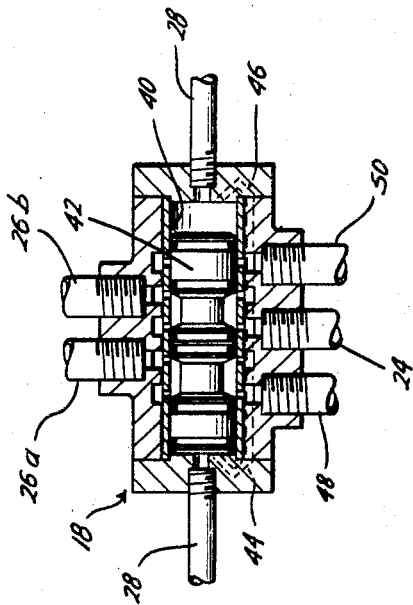
Edgar H. Douglas
INVENTOR.
BY
ATTORNEYS United States Patent Office 3,445,104
Patented May 20, 1969

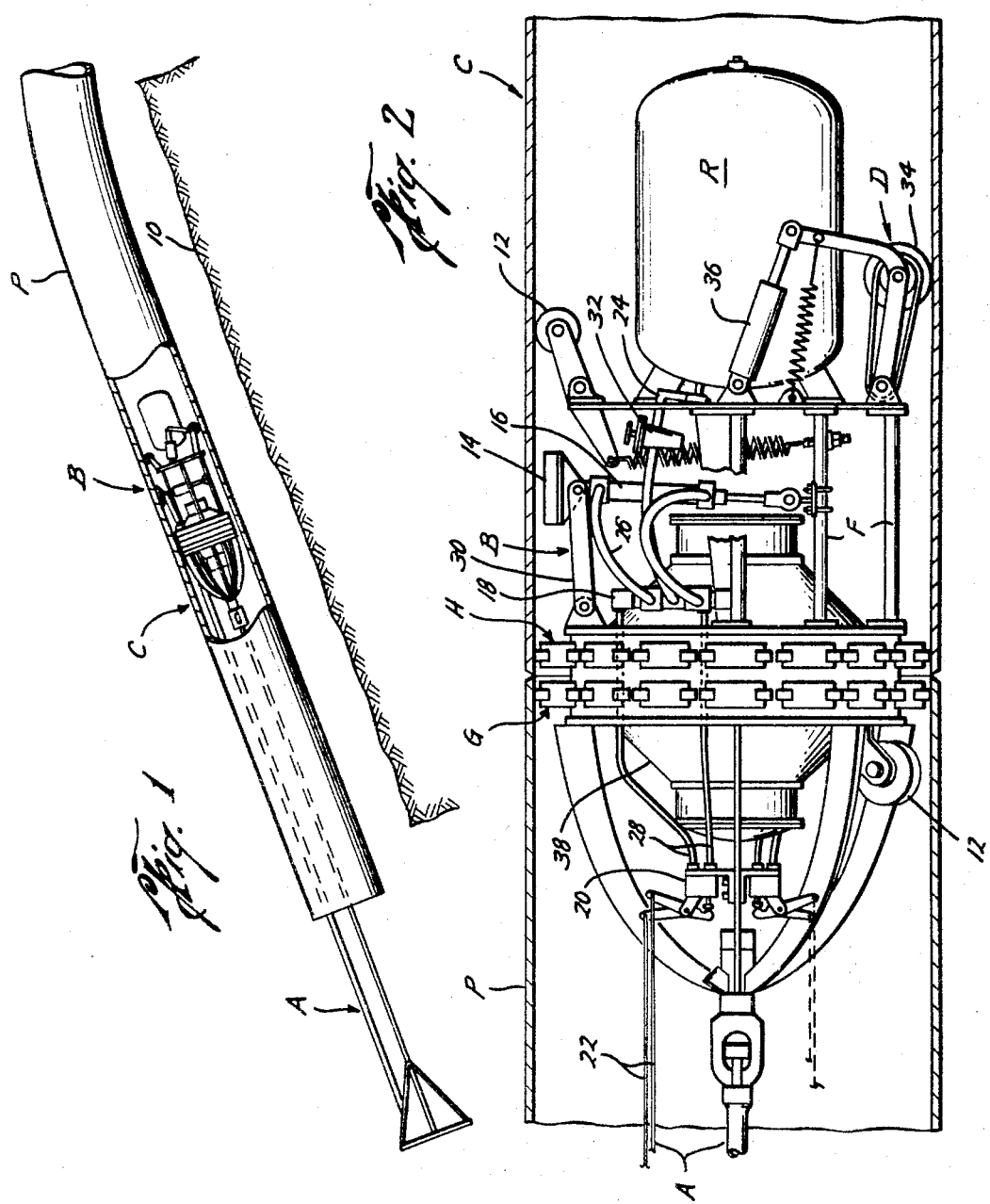

3,445,104
INTERNAL PIPE CLAMP
Edgar H. Douglas, Houston, Tex., assignor to CRC
Crose International, Inc., Houston, Tex., a corporation of Oklahoma
Filed Nov. 29, 1966, Ser. No. 597,823
Int. Cl. B23q 3/14, 1/00
U.S. Cl. 269—48.1                                       4 Claims

ABSTRACT OF THE DISCLOSURE

An internal pipe clamp adapted to hold abutting edges of pipes in alignment and including a frame with clamps and a brake mounted thereon, a pressure fluid tank mounted on the frame, control means between the clamps and the tank to actuate the clamps, control means between the brake and the tank to actuate the brake and a means of moving the frame through a pipe.

---

The present invention relates to an improved internal pipe clamp for use in aligning adjacent ends of pipes and retaining such pipes in proper position for welding.

Internal pipe clamps such as disclosed in the Ernest E. Cummings, United States Patent No. 3,044,431, issued July 17, 1962, have been used commonly in the construction of cross-country pipelines. Since variations in terrain are encountered in many cross-country pipelines, difficulties have been experienced with such prior pipe clamps in controlling the movement of the pipe clamp within a pipe which is positioned on a slope. Particularly, when the movement of the pipe clamp within the pipe is downwardly at a substantial grade, it is difficult to control the movement of the pipe clamp so that it can be properly positioned between adjacent ends of pipes for welding.

It is therefore an object of the present invention to provide an improved internal pipe clamp whose movement through a pipe is easily and readily controlled.

Another object is to provide an improved internal pipe clamp which may be clamped within adjacent ends of pipes regardless of the slope of the pipes.

A further object is to provide an improved internal pipe clamp having provision for braking its movement through a pipe on a downhill slope.

A still further object is to provide an improved internal pipe clamp adapted to move under its own power through a pipe with such movement being readily and easily controlled from outside the pipe.

Still another object is to provide an improved braking system for an internal pipe clamp.

These and other objects and advantages are hereinafter fully set forth in the following specification and are described in reference to the drawings which illustrate a preferred form of the present invention and wherein:

FIGURE 1 is an elevation view of a pipeline with the pipe partly broken away to show the pipe clamp of the present invention therein;

FIGURE 2 is a sectional view of adjacent ends of two pipes being held in position for welding by the preferred form of pipe clamp of the present invention with the brake in the disengaged position;

FIGURE 3 is another sectional view of a pipe with the preferred form of pipe clamp of the present invention and shows the brake in the set position; and FIGURE 4 is a sectional view of a brake control valve which may be used for controlling the brake on the pipe clamp of the present invention.

In FIGURE 1 the movement of the preferred form of internal pipe clamp C of the present invention through a pipe P which is positioned on an incline is shown. As is usual in the construction of pipelines, the pipe P is positioned over a trench and held in such position above the bottom 10 of the trench by suitable equipment (not shown). When a joint has been completely welded, the pipe clamp C is actuated to release its clamping means adjacent the joint and the clamp is moved through the pipe toward the open end. The control mechanisms A extend from the clamp C through the pipe and beyond the open end thereof.

When the pipe slopes downhill toward its open end, the braking system B is used to control the movement of the pipe clamp C. It is generally preferred that the braking system be alternately applied and released in rapid succession so that the pipe clamp movement is maintained under control to prevent excess velocity of the pipe clamp through the pipe. From FIGURE 1 it can be seen that without a braking system, the pipe clamp C could gain such velocity that stopping it at the desired position in the open end of the pipe would be difficult.

The structure of the pipe clamp C as shown in the drawings is substantially similar to the pipe clamp disclosed in the aforementioned E. E. Cummings patent. It includes a frame F, a plurality of wheels 12 which are supported on the frame F and are adapted to engage the interior of a pipe to allow the pipe clamp to roll therethrough, driving means D, the forward and rear clamping means G and H, the pneumatic pressure reservoir R, the braking system B and suitable control mechanisms A.

The braking system B is supported from the frame F in a position so that the brake shoe 14 may engage the interior of the pipe when the braking system is actuated. The braking system B includes the brake shoe 14, the actuator 16, control means such as switching valve 18, bleeder valves 20, control wires 22 and fluid lines 24, 26 and 28 connecting switching valve to the pneumatic reservoir R, to the actuator 16 and to bleeder valves 20, respectively. One end of actuator 16 is secured to the frame F and the other end of actuator 16 is movably supported by linkage arm 30 which is pivotally connected both to frame F and to actuator 16.

As hereinafter more fully explained, the braking system is operated by alternately operating the two bleeder valves 20 so that pressure fluid is conducted from the reservoir R through line 24 and a pressure regulator 32 to the switching valve 18 which in response to the bleeder valves 20 alternately directs pressure fluid to opposite ends of actuator 16 while venting the other end thereof. Fluid pressure in one end of actuator 16 moves brake shoe 14 into braking engagement with the interior of pipe P and fluid pressure in the other end of actuator 16 retracts brake shoe 14 from braking engagement with the interior of pipe P. Thus, by manipulation of control wires 22, the braking system B is alternately actuated and released.

The wheels 12 and driving means D which includes the wheel 34, the actuator 36 and a motor (not shown) support the pipe clamp C in rolling engagement within the pipe P. It should be noted that sufficient support should be provided by at least one of the wheels to support the frame F when the braking system B is actuated.

The forward and rear clamping means G and H each include a series or set of roller clamps extending around the periphery of the housing 38. Each set or series of roller clamps are independently actuated by suitable actuating and linkage mechanisms contained within the housing 38 so that either or both of said series may be engaged with or disengaged from the interior of pipe P. Actuation of clamping means G and H is accomplished by actuation of the control mechanism A to set the roller clamps against the interior of two abutting pipes as best shown in FIGURE 2.

The control mechanisms A function to control the operation of the driving means D, the clamp means G and H and the braking system B. Generally, it may be preferred to disconnect the control wires for the driving means D (shown as dash lines in FIGURE 2) and connect them as the control wires 22 to control the braking system B when the pipe clamp C is moving downwardly through the pipe P. Normally the driving means D and the braking system B are not needed at the same time, however, separate control wires for both systems may be provided so that both systems are operable at the same time.

Switching valve 18 which controls the flow of pressure fluid to and from actuator 16 is illustrated in FIGURE 4. Valve 18 defines the cylinder 40 in which the spool 42 is adapted to reciprocate to cause a switching of pressure fluid to opposite ends of actuator 16. Pressure fluid is directed into valve 18 through line 24 from reservoir R. The passageways 44 and 46 connect to line 24 to direct pressure fluid to opposite ends of the cylinder 40. Such passageways 44 and 46 are restricted in comparison to the bleeder lines 28 for the purpose hereinafter explained. Line 24 is in communication with cylinder 40 and with one of lines 26a or 26b, depending on the position of spool 42. As shown, line 24 is in communication with line 26b and line 26a is in communication with vent 48. When spool 42 is moved to the right, responsive to the exhausting of pressure fluid from the right hand end of cylinder 40, line 24 is in communication with line 26a and line 26b is in communication with vent 50. The switching valve 18 while directing pressure fluid to one end of actuator 16 exhausts pressure fluid from the other end of actuator 16. The movement of spool 42 is controlled by the valves 20 alternately exhausting pressure fluid from one end of cylinder 40 at a rate greater than the flow of pressure fluid therein through one of the passageways 44 and 46.

In operation, the pipe clamp C is positioned as shown in FIGURE 2 to retain the ends of pipe sections aligned and in abutting relationship for welding, that is, both clamping means G and H are extended. When the welding of the joint is completed, both clamping means G and H are retracted and the pipe clamp G moves toward the open end of the pipe P. When the pipe P is approximately level or inclines upwardly toward its open end, the driving means D is actuated to move the pipe clamp C through the pipe P. When the pipe P inclines downwardly toward its open end, the braking system B is utilized to maintain control of the movement of the pipe clamp C by alternately actuating and releasing the brake shoe 14. FIGURE 3 illustrates the pipe clamp C moving through the pipe P at a time when the brake shoe 14 has been actuated into braking engagement with the interior of pipe P. The pipe clamp C is stopped and the rear clamping means H are actuated when the rear roller clamps are within the open end of the pipe and the forward roller clamps are beyond the end of the pipe. With the pipe clamp C in this position, a next section of pipe is moved into approximately aligned and abutting relationship with the open end of the pipe P. To hold the next section in position for welding and to assure alignment, the forward clamping means G are actuated. Thus, the pipe clamp C has been returned to the position illustarted in FIGURE 2.

From the foregoing it can be seen that the present invention provides an improved internal pipe clamp suitable for clamping adjacent ends of pipe together for welding and for controlled movement through the pipe. The improved braking system is used to control the movement of the pipe clamp through a pipe which is inclined downwardly in the direction of movement of the pipe clamp.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:
1. An internal pipe clamp, comprising
a frame,
wheels mounted on said frame and adapted to support said frame for movement through a pipe,
a tank mounted on said frame and adapted to contain a supply of pressure fluid,
a pair of spaced apart sets of roller clamps,
means actuating each of said sets of roller clamps to move said clamps into and from clamping engagement with the interior of a pipe,
control means connecting said tank to said actuating means to control the actuation of said roller clamps,
a brake shoe,
means supported on said frame and adapted to move said brake shoe into and from braking engagement with the interior of the pipe in which said pipe clamp is positioned to set and release said brake shoe,
control means connecting said tank to said brake moving means to control the actuation of said brake shoe,
said brake shoe moving means exerting sufficient force on said brake shoe to control the movement of said pipe clamp,
a drive means mounted on said frame and adapted to engage the interior of said pipe to move said pipe clamp through said pipe, and
control means controlling said drive means.
2. An internal pipe clamp according to claim 1, wherein
at least one of said wheels is positioned to engage the interior of said pipe to support the reaction force when said brake shoe is in braking engagement with said pipe.
3. An internal pipe clamp, comprising
a frame,
means mounted on said frame for supporting said frame for movement through a pipe,
a pair of spaced apart sets of clamps,
means for actuating each of said sets of clamps to move said clamps into and from clamping engagement with the interior of a pipe,
a tank mounted on said frame and adapted to contain a supply of pressure fluid,
a brake shoe,
means supported on said frame and adapted to move said brake shoe into and from braking engagement with the interior of the pipe in which said pipe clamp is positioned to set and release said brake shoe and
control means connecting said tank to said brake moving means to control actuation of said brake shoe,
said brake shoe moving means exerting sufficient force on said brake shoe to control movement of said frame.
4. An internal pipe clamp, comprising
a frame,
means mounted on said frame for supporting said frame for movement through a pipe,
a tank mounted on said frame and adapted to contain a supply of pressure fluid,
a pair of spaced apart sets of clamps,
means for actuating each of said sets of clamps to move said clamps into and from clamping engagement with the interior of a pipe,
control means connecting said tank to said actuating means to control the actuation of said clamps,
a brake shoe,
means supported in said frame and adapted to move said brake shoe into and from braking engagement with the interior of the pipe in which said pipe clamp is positioned to set and release said brake shoe,
control means connecting said tank to said brake moving means to control the actuation of said brake shoe, said brake shoe moving means exerting sufficient force on said brake shoe to control movement of said pipe clamp, and means mounted on said frame for moving said pipe clamp through a pipe.

References Cited

UNITED STATES PATENTS

| | | | |
|---|---|---|---|
| 2,823,634 | 2/1958 | Barth | 269—48.1 |
| 2,878,770 | 3/1959 | Work | 269—48.1 X |
| 3,044,431 | 7/1962 | Cummings | 269—48.1 X |
| 3,197,195 | 7/1965 | Work | 269—48.1 X |
| 3,261,529 | 7/1966 | Pagan | 269—48.1 X |

LESTER M. SWINGLE, *Primary Examiner.*

JAMES F. McKEOWN, *Assistant Examiner.*

U.S. Cl. X.R.

269—50